United States Patent Office 3,383,756
Patented May 21, 1968

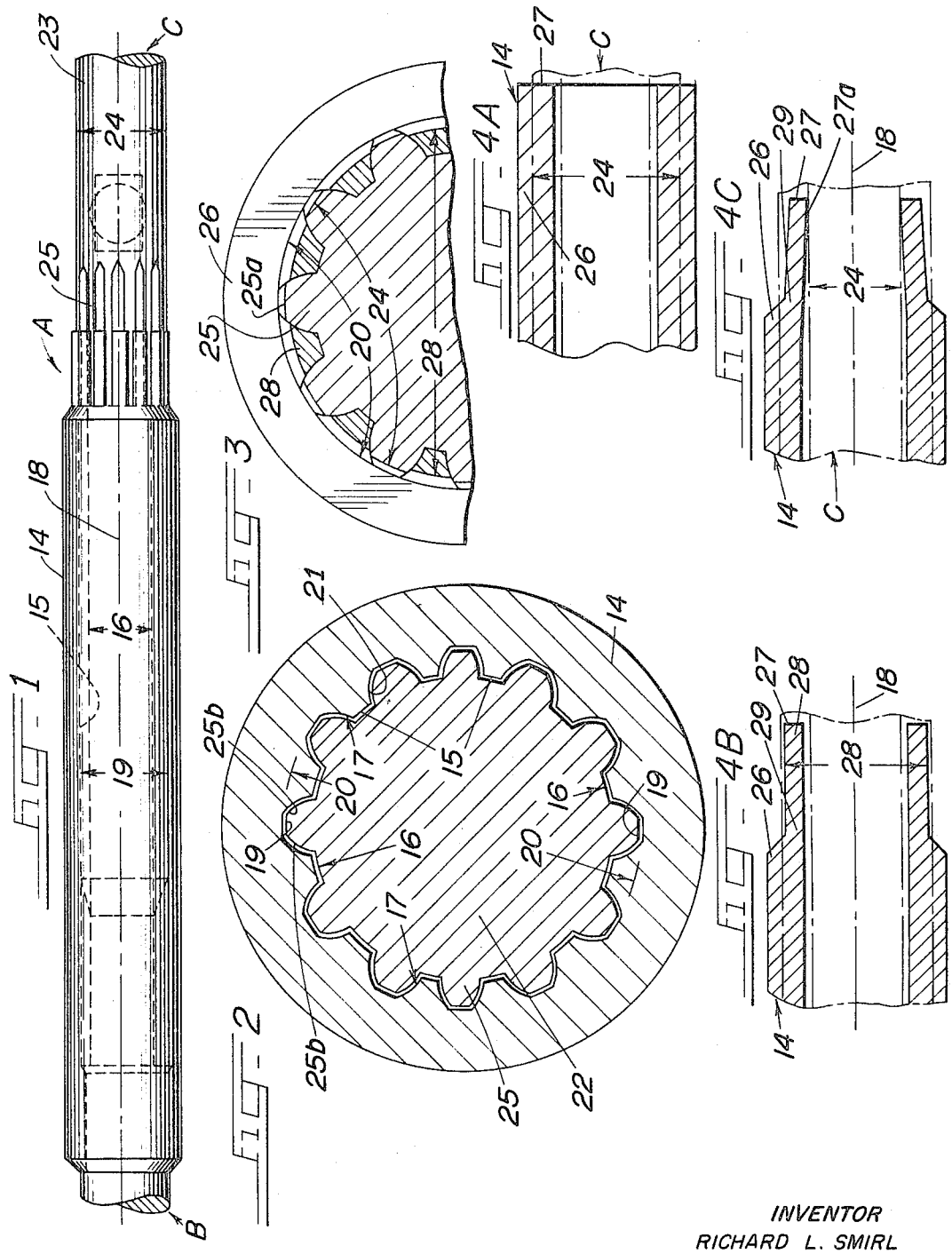

3,383,756
METHOD OF MAKING A SLIP JOINT
Richard L. Smirl, La Grange Park, Ill., assignor to Borg-Warner Corporation, Chicago, Ill., a corporation of Illinois
Filed Nov. 26, 1965, Ser. No. 509,708
1 Claim. (Cl. 29—436)

ABSTRACT OF THE DISCLOSURE

A process for manufacturing a slip joint from a pair of shaft to mitigate rotary backlash.

---

The present invention relates to a method of forming tubular articles particularly useful in such applications as splined slip joints.

Slip joints are typically formed by broaching longitudinal splines on the mating surfaces of telescoping tubular members; such splines are formed according to recognized data of gear design for optimum transmission of rotary power while permitting relative freedom between the splines to enable a relative longitudinal sliding movement between members. Inherent in such fabrication technique is dimensional slack, although slight, between the mated splines of the members which contributes to rotary backlash; such backlash can become serious in such applications as steering linkages where the slightest degree of rotary lash is undesirable.

It is a principal object of this invention to provide a method of forming a slip joint by improved steps by which may be applied following the typical forming steps now currently employed. Such method is characterized by its simplicity in that it utilizes a portion of the preformed spline joint structure to provide a flexing part effective to take up unwanted backlash.

Other objects and advantages of this invention will become more apparent from the following detailed description taken in connection with the accompanying drawings in which:

FIGURE 1 is a central sectional view of a slip joint formed by the invention hereof;

FIGURES 2 and 3 are enlarged sectional views taken substantially along respective lines 2—2 and 3—3 of FIGURE 1; and FIGURES 4A–4C represent progressive steps according to the invention herein for the manufacture of a splined slip joint.

The slip joint, broadly designated A, comprises a first shaft B including a tubular member 14 defined with an interior cylindrical surface 15 having a diameter 16. A plurality of circumferentially arranged interior female spline portions 17 are formed into the interior surface 15 of member 14 by any of a number of suitable methods, for example, broaching, each spline extending longitudinally parallel to a central axis 18 of member 14. The surface 15 is formed so that each spline is provided with generally radially directed side surfaces 21 meeting at a valley surface 19 lying on a diameter 20 of the member 14. Similarly, a shaft C or inner member having an outer surface 23 with a diameter 24 is formed to provide a plurality of longitudinally extending male splines 25 spaced circumferentially to mate with the female spline portions 17. Such splines 25 again may be formed by a broaching operation resulting in a spline shape having outer flat surface 25a lying on a circle slightly less in diameter than 20. The spline sides 25b are generally radially directed complementary to sides 21.

Next, at least one of the members is reformed (here member 14) by removing the annular portion 26 of the tubular member 14 which supports the female splines adjacent to one end 27 to a diameter 28 less than diameter 20; the residual spline portions 28 or fingers extend and are outwardly attached only at one neck 29 thereof (see FIGURE 4B). The residual spline portions 28 then (see FIGURE 4C) are bent or deformed in a radial direction so that the outer extremities or ends 27 are biased toward the central axis 18 to leave the inner edge 27a of ends 27 disposed slightly radially inwardly of diameter 24.

Finally the members are assembled together so that the male and female splines of each of the members are interleaved and adapted for transmission of rotary power; during such assemblage the residual spline portions 28 of the outer member 14 are flexed radially outwardly since they protrude inwardly of the diameter 24 of shaft C. Such spline portions 28 tend to resiliently wedge against the radially directed sides 21 of the male splines (see FIGURE 4C) thereby taking up rotary slack to avoid blacklash.

While I have described my invention in connection with one specific embodiment and other alternative suggestions thereof, it is understood that this is by way of illustration and not by way of limitation and the scope of my invention is defined solely by the appended claim which should be construed as broadly as the prior art will permit.

I claim:

1. A process for manufacturing a slip joint from a pair of shafts, at least one of said shafts including a tubular member, the steps of said process comprising:

forming a plurality of axially extending spline portions in the interior surface of said tubular member such that said spline portions define side walls which are generally radially directed with respect to the axis of said tubular member;

forming a plurality of projections on said other shaft such that said projections define mating side walls which are generally radially directed with respect to the axis of said shaft, said projections being adapted to engage said spline portions;

removing a peripheral terminal portion of said tubular member to a radial depth sufficient to define resilient spaced-apart fingers;

bending said resilient spaced-apart fingers toward the axis of said tubular member; and assembling said members together whereby the sides of said fingers resiliently engage the sides of said projections to mitigate backlash between shafts.

References Cited

UNITED STATES PATENTS

| 1,907,897 | 5/1933  | Swegles  | 72—340   |
| 1,942,782 | 1/1934  | Smith    | 64—9     |
| 2,338,758 | 1/1944  | Fast     | 64—9     |
| 2,386,048 | 10/1945 | Harkness | 74—567   |
| 2,432,307 | 12/1947 | Good     | 29—442 X |
| 2,659,217 | 11/1953 | Talbot   | 64—9     |
| 2,861,437 | 12/1958 | Bachman. |          |

THOMAS H. EAGER, *Primary Examiner.*